United States Patent [19]

Creswick

[11] Patent Number: 4,668,525

[45] Date of Patent: May 26, 1987

[54] TEA EXTRACTION PROCESS

[75] Inventor: Norman S. Creswick, Wyckoff, N.J.

[73] Assignee: Thomas J. Lipton, Inc., Englewood Cliffs, N.J.

[21] Appl. No.: 337,300

[22] Filed: Jan. 5, 1982

[51] Int. Cl.$^4$ ................................................ A23F 3/18
[52] U.S. Cl. ...................................... 426/597; 426/435
[58] Field of Search ................................ 426/435, 597

[56] References Cited

U.S. PATENT DOCUMENTS

| | | |
|---|---|---|
| 3,080,237 | 3/1963 | Bonotto . |
| 3,224,873 | 12/1965 | Di Nardo .................. 426/432 X |
| 3,451,823 | 6/1969 | Mishkin et al. . |
| 3,666,484 | 5/1972 | Gurkin et al. .................. 426/435 X |
| 3,939,286 | 2/1976 | Jelks . |
| 3,971,858 | 7/1976 | Collier et al. .................. 426/435 X |

OTHER PUBLICATIONS

Whistler et al, Industrial Gums, 2nd Ed., 1973, Academic Press: New York, p. 447.
Pentauro, Soluble Coffee Manufacturing Processes, 1969, Noyes Development Corporation: Park Ridge, N.J., pp. 42–43.
Pentauro, Soluble Tea Production Processes, 1970, Noyes Data Corp.: Park Ridge, N.J., p. 28.

Primary Examiner—Joseph Golian
Attorney, Agent, or Firm—Brumbaugh, Graves, Donohue & Raymond

[57] ABSTRACT

Dry tea leaf is extracted with aqueous solvent, preferably by countercurrent procedures at atmospheric pressure, the spent tea leaf is separated from the extract, the spent tea leaf is acidified to a pH within the range of 2.0 to 3.0, the acidified spent tea leaf is further extracted with aqueous solvent at temperatures of about 140°–170° C. for at least 4 minutes at pressures of about 80–100 psig to provide a high temperature/high pressure acid extract, and said high temperature/high pressure acid extract is used as aqueous solvent in the earlier extraction procedures to provide a high extraction yield of good quality extract.

9 Claims, 1 Drawing Figure

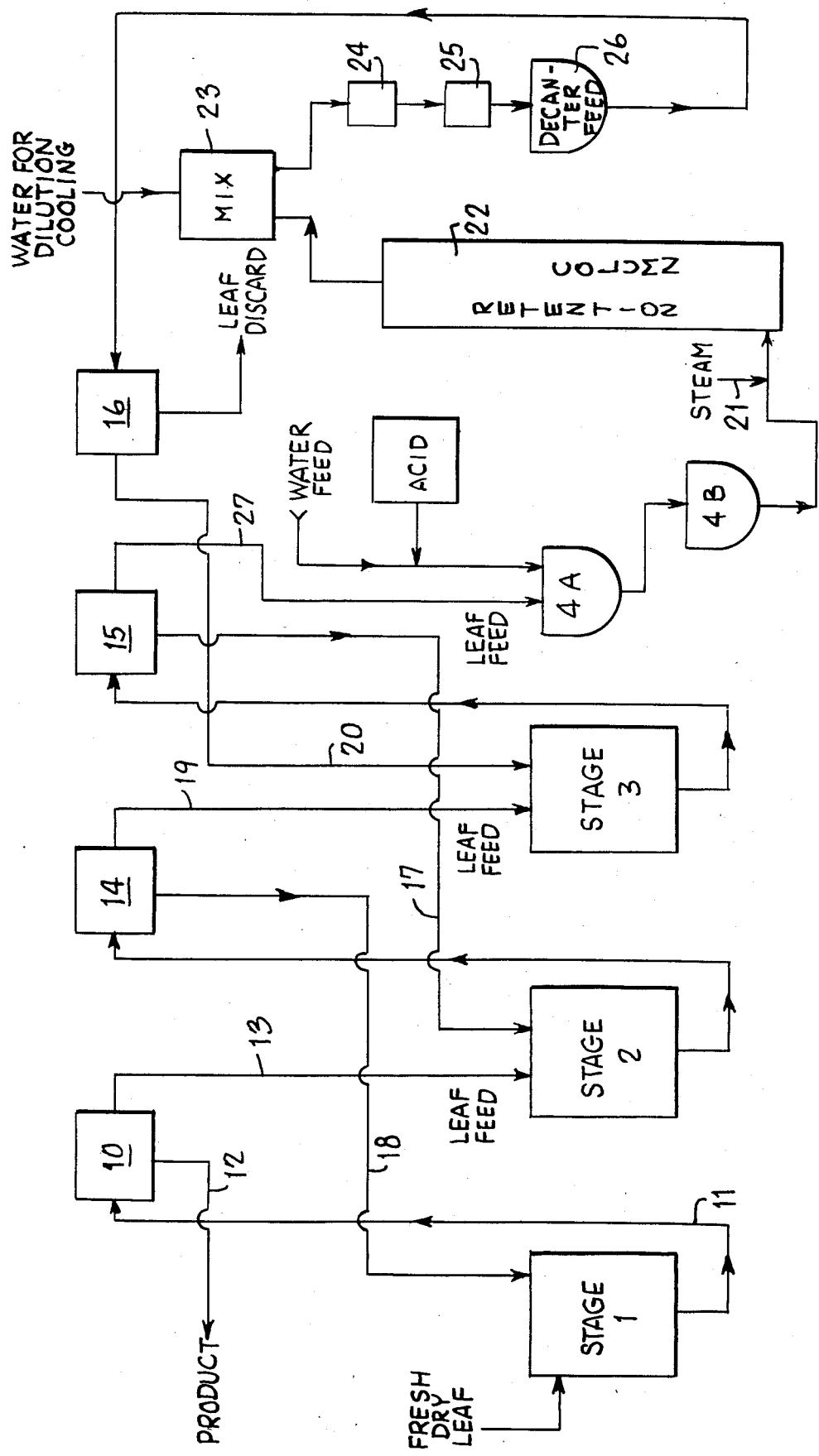

TEA EXTRACTION PROCESS

BACKGROUND OF THE INVENTION

This invention relates to an improvement in the art of preparing tea extracts.

An ever increasing proportion of tea marketed in the world is marketed in the form of tea extracts, usually in the form of dry powders. Substantial research activity has been directed to the problems of obtaining tea extracts in the form of dry powders that upon reconstitution provide a high quality beverage, having a flavor and color which is as close as possible to that obtained by brewing tea from tea leaf. These processes may involve use of conditions which separately collect and set aside the flavor components before the tea is subjected to rigorous extraction conditions. The flavor components are then added back to the extracted water soluble tea solids at a subsequent stage in the process.

Another aspect of tea extract production is yield of soluble solids. For reasons of economics, processes which assure the highest possible recovery of water soluble solids from the tea leaf are desired.

Methods of obtaining tea extracts using a series of countercurrent stages are well-known in the art. The Bonotto U.S. Pat. No. 3,080,237, for example, discloses a process wherein fresh aqueous solvent is brought into contact first with the tea leaf which has been extracted in several earlier stages, and wherein the fresh dry tea leaf is first contacted with concentrated aqueous tea leaf extract. Temperatures of extraction varying from room temperature to elevated temperatures as high as 180° C. or higher have been used, together with elevated pressures needed to maintain the high temperatures. The Mishkin et al. U.S. Pat. No. 3,451,823, for example, discloses a two-stage extraction wherein a first extraction stage is conducted at temperatures not exceeding 110° C. to provide a first extract, the partially extracted leaf is comminuted and water added to form a pumpable slurry, and the slurry heated to 180° C. to provide a second extraction. The two extracts are combined and dried to provide the product.

It is also known that strongly acid conditions at elevated temperature hydrolyze plant matter containing cellulose to saccharides. This is disclosed, for example, in the Jelks U.S. Pat. No. 3,939,286, where the process is used to treat cellulosic plant materials to increase the digestibility thereof by ruminants.

STATEMENT OF THE INVENTION

It has now been found that an improved method for extracting tea from tea leaves is provided by first conducting an extraction of tea leaf with aqueous solvent and by then subjecting the remaining spent tea leaf to strong acid conditions in the pH range of about 2.0–3.0 under a pressure of 80 to 100 psi and temperatures in the range of 140°–170° C. for a period of time in excess of 4 minutes to extract further solids. The slurry is then separated into spent leaf and extract. The spent leaf is discarded while the high temperature/high pressure acid extract is used as the aqueous solvent in an earlier stage of the extraction process.

In a preferred embodiment of the invention, the first extraction of the tea leaf is accomplished using a multi-stage countercurrent procedure under conditions of atmospheric pressure and at temperatures not exceeding about 100° C. It is recognized, however, that a first extraction step which is only a single stage or one utilizing temperatures above 100° C. and elevated pressure may be employed to advantage prior to the the high temperature/high pressure/acid extraction stage, and these alternate embodiments are disclosed as part of the invention.

The process of the present invention provides an exceptionally high yield of soluble tea solids. Prior art processes give extraction yields ranging from 33–36% of raw tea leaf solids as soluble instant tea. By way of comparison, the process of the present invention provides yields of soluble solids in the range of 47–51% on the same basis. Extraction yield is herein defined as 100 times the weight of soluble solids extracted divided by the weight of the raw leaf fed to the extraction process.

It is recognized that high temperature and pressure conditions by themselves will provide some increase in yield. Such conditions, i.e., 80–100 psi and 140°–170° C., however, yield solids which gel upon concentration to about 20–25% and are not suitable for use in instant tea. On the other hand, use of even higher temperatures and pressures, in the order of 200 psi and corresponding high temperature, will reduce the molecular weight of the extracted products to provide desirable viscosities, but an undesirable scorched flavor component results. Further, while the use of acid has been described in the literature, it has never been proposed or suggested that the combination of these conditions in the manner suggested would provide such a substantial increase in yield. Furthermore, even though more rigorous extraction conditions are applied to the tea leaf than are applied under more moderate conditions, little or no adverse effect upon the flavor of the resulting tea is observed.

The process of the present invention may be applied to any raw tea leaf in the dried form; either green, oolong, or black tea or any desirable mixture thereof may be used.

The preferred embodiment of the process of the present invention contemplates a countercurrent multi-stage extraction of soluble solids from tea leaf using water as the solvent. It is further preferred that the conventional countercurrent extraction phase comprise three atmospheric pressure stages, referred to for convenience as the first, second, and third stages. In accordance with the present invention, a fourth stage is provided, wherein the spent tea leaf from the third stage is acidified, and held under high pressure and temperature conditions to extract substantial additional quantities of tea solids.

At least three atmospheric pressure stages are preferred for a number of reasons, including improved yield and the provision of neutralization or buffering capacity. The extract leaving the high pressure/high temperature acid extraction stage generally has a pH in the range of 2.4 to 2.8. Passing this extract in contact with fresh batches of wet leaf in the atmospheric stages of the process raises the pH of the extract, at the rate of about 0.5 units per stage. Thus, a 3-stage atmospheric extraction raises the pH of the extract to the range of 4.0 to 4.5. A 2-stage atmospheric extraction process may be used, but in that event, neutralization of the excess acidity by addition of a base may be required. On the other hand, 4 or more atmospheric pressure stages may be employed, where desired.

When conducting the high temperature/high pressure acid extraction stage of the process of the present invention, a number of important considerations must be kept in mind. The pH may be adjusted by adding a strong acid of food grade quality. Hydrochloric, HCl; phosphoric, $H_3PO_4$; sulfurous, $H_2SO_3$; sulfuric, $H_2SO_4$; nitric, $HNO_3$; and acetic, $CH_3COOH$ acids are suitable. Sulfuric acid is preferred, as providing a superior taste and flavor; at the same time, it is less corrosive to equipment than, e.g., hydrochloric acid.

A second factor requiring care is the pH of the tea leaf slurry. It has been established that sufficient acid should be added to bring about a pH in the slurry of below about pH 3. Subjecting the leaf solids at pH above 3 to high temperature/high pressure conditions yields a tea extract that, upon concentration above 20–25% solids, tend to come out of solution or gel, and is therefore not suitable for use in instant tea manufacture. A pH below about 2, on the other hand, provides undesirable flavors and degradation of the tea, as well as corrosion problems with equipment.

The pH range of the tea slurry during high temperature/high pressure extraction is also an important consideration where the final product is spray dried. It has been found that tea solids obtained at this stage of the extraction when the pH ranges between about 2 and 3 serve to complement those debulking agents normally present in tea extracts and help to decrease bulk density of the dried tea powder. Certain blends of tea solids are found to be deficient in these debulking agents. However, use of a pH below about pH 2 or above about pH 3 provides solids which are less effective in their debulking characteristics.

Also important to the process of the present invention are the pressure and temperature conditions used in the high temperature/high pressure extraction stage. Conditions within the stated ranges provide a product with an acceptable flavor. Care must be taken to maintain the pressure and temperature within the ranges of about 80 to 100 psi and 140°–170° C. Conditions below these ranges provide products of undesirable characteristics, including a condition which causes the solids to precipitate out of solution in the extract when the extract is concentrated prior to drying. Conditions in excess of these ranges give scorched flavors which are undesirable.

It has been found that the acidified tea leaf slurry should be maintained under the high temperature/high pressure conditions for at least 4 minutes. Contact times longer than this are readily tolerated, and up to 12 hours has been investigated without adverse changes in the product. A contact time of 15 minutes to 1 hour is generally preferred.

The process of the present invention is described with reference to the attached drawing, which shows a flow diagram of a preferred embodiment thereof.

The first stage of the process, Stage 1 of the drawing, comprises a vessel containing fresh dry tea leaf. Fresh water or other aqueous solvent is added to the leaf, the extraction takes place, and the mixture of tea leaf and solvent is pumped to a decanter 10, via line 11, where it is separated into product extract which leaves the system via line 12, and wet leaf, which is sent to Stage 2 as leaf feed via line 13.

At Stage 2, the leaf from decanter 10 is mixed with aqueous extract recovered from Stage 3 and decanter 15 via line 17; after suitable contact time, the mixture is pumped to decanter 14, where it is separated into extract, which is supplied as solvent to Stage 1 via line 18, and wet leaf, which is supplied as leaf feed to Stage 3 via line 19.

Stage 3 operates as Stages 1 and 2, except that the solvent used is extract received from the high pressure/high temperature acid extraction stage via line 20, and decanter 16. The spent leaf from Stage 3 is separated in decanter 15 and supplied to kettle 4A via line 27. Tea extracts from other stages may be introduced at either the first, second, or third stages. In a preferred procedure, the Stages 1, 2 and 3 are conducted at atmospheric pressure and at a temperature of 85°–99° C.

While closed columns may be used to contain the tea leaf during each of the extraction stages, an arrangement comprising open kettles is preferred. One convenient process employs two kettles for each stage, an upper or "A" which receives the solvent from a later stage and a fresh leaf source and heats these materials to the desired temperature and a lower or "B" kettle which receives the complete batch from the "A" kettle and acts as a surge for a slurry pump which transfers the leaf and water mixture to a decanting centrifuge. The centrifuge separates the liquid and solid phases, transferring the leaf to a later stage or to a spent leaf discard system and the solvent to an earlier stage or on to the next unit operation in the process.

The "A" and "B" kettles are shown in the drawing with respect to the fourth stage. In conducting the fourth stage, acid is added to the leaf and solvent coming into the "A" kettle and is then dropped as an acidified slurry to the "B" kettle where heat is provided. A slurry pump is then used to pass the mixture in series through a steam injection heater 21, a pressurized retention column 22, a pressurized water addition vessel 23 which provides initial cooling and required dilution, a heat exchanger 24 to provide final cooling, and a pressure control system 25, before passing to a kettle 26 which serves as the feed to the final decanting centrifuge 16.

The addition of leaf, water and acid in the fourth stage are preferably batch additions, while the transfer of solvent, leaf and slurry in Stages 1–3 is preferably continuous, this being achieved by setting the rates of the slurry pumps so that the contents of one batch are completely pumped out from the lower kettles precisely as the next batch is being dropped into those kettles.

Although heating of the acid tea leaf slurry with steam injection is shown at 21 in the drawing, it has been found that other methods of heating may be employed. These include scraped-surface heat exchangers, such as those sold under the trademark Votator. Similarly, Votator devices and other heat exchange devices may be used at 24 to cool the acid extract to a temperature below its boiling point before feeding it to the decanter feed kettle 26.

As in prior art processes, tea aromas may be stripped from the extract, recovered, and added back at a later stage in the process. Aroma stripping is an optional feature, and, where employed, may be conveniently applied to the extract leaving decanter 10 as the product.

The tea extracts made according to the present invention may be concentrated and dried, as by spray drying, to a powder. It is generally preferred, however, to subject these aqueous extracts to the customary further treatments of dehazing and decreaming, where desired, prior to drying. In addition, the green tea extracts may be further treated to convert them to black tea, and blends of various extracts may be made, either prior or subsequent to drying, in order to achieve desired flavors or colors in the tea made by reconstituting the dried product.

In view of the acid conditions prevailing in the process of the present invention, corrosion-resistant materials should be used in fabricating the equipment used. Type 316 stainless steel is suitable for the Stage 4 portion of the process, while Type 304 stainless steel will withstand the acidity in the centrifuge stream 20 supplying solvent to Stage 3.

The invention will be further described in the working examples which follow.

EXAMPLE 1

A series of instant tea extraction processes were conducted on a pilot plant scale using a countercurrent four-stage extraction of soluble solids from tea leaf with water as the solvent. The first three stages were conducted at atmospheric pressure and at temperatures approaching the boiling point. A fourth phase in which high temperature and high pressure conditions were applied to a strongly acidic leaf slurry was then used.

Before starting the process, the retention column for the fourth stage was preheated with steam to approximately 300°-310° F. using 110 psi steam. The first three stages of the extraction were conducted in the manner normal to countercurrent extraction procedures with water feed until sufficient spent leaf was available from the third stage to commence the fourth extraction stage.

The first three stages of extraction were started by filling the upper kettle of stage 1 with 25.7 gallons of water and the water was heated to 206°-210° F. Fresh leaf was dropped into the kettle in the amount of 15 pounds per batch at the rate of 120 pounds per hour at 5.5% moisture. A 7.5 minute time cycle for each batch was used, which meant that the tea leaf had a nominal contact time of 7.5 minutes at each extraction stage. Each of the second and third stages were started in the same manner, moving the spent leaf from the first to the second and from the second to the third as feed to the upper kettle. At the same time, extract from the second was used as solvent feed to the next cycle of the first, and extract from the third was used as the solvent feed to the next cycle of the second. After the three stage system was established in normal operation, it was found that the extraction yield of soluble tea solids ranged from 26-33% by weight.

In starting up the fourth stage, leaf and extract from the third stage was decanted and separated. Clarified extract was pumped back to the second stage kettle as extraction solvent for that stage. The leaf collected from stage 3 was added to a fourth stage kettle. In this fourth stage process, approximately 37.2-51.8 pounds per batch of leaf was used. Sufficient water at 190° F., 15.2 gallons per batch, was pumped to the kettle to make up a 2.4-3.4:1 water to leaf slurry.

Sulphuric acid at 93.17-94.0%, 66° baume concentration was added to the leaf slurry at a level of 0.75% based on wet leaf weight. The combined weight of the completed batch varied between 164.8-179.2 pounds to provide a rate of 1318-1435 pounds per hour.

At this point, the temperature of the acid slurry was 180° F. It was then dropped into the kettle "B" and pumped into the high pressure portion of the system while being heated by steam at 100 psig through a steam injector to maintain a temperature of about 155° C. A combined weight of acid slurry plus steam condensate of 1513-1653 pounds per hour was thus provided.

The acid slurry was flowed with steam injection into a retention column wherein each tea particle is subjected to a maximum temperature of about 155° C. for 15 minutes. Thereafter, the slurry was permitted to leave the retention column flowing into a totally enclosed dilution mixing pot wherein it was mixed with 16° C. water sufficient to provide an overall water to leaf ratio of about 13.3:1. This resulted in a decrease in the mixture temperature to between about 132°-134° C. From the mixing pot the slurry passed through a heat exchanger which decreased the dilution slurry temperature to 99° C., up to back pressure valves set at 63 psig. After passing through the back pressure valve, the slurry was collected and passed to a decanter. The separated extract from the decanter was conveyed to Stage 3 and used as the aqueous solvent supply to that stage. The spent leaf from the decanter was discarded.

The following TABLE I gives the yield obtained by conducting the four-stage extraction process set forth above using dry green tea leaf as the raw material:

TABLE I

FOUR-CELL EXTRACTION PROCESS DATA (GREEN TEA PROCESS)

| | % Solids | pH | Average Extraction Yield, % |
|---|---|---|---|
| HPA Cell Extract | 1.50 ± .5 | 2.24-3.00 | 17.0 |
| 3rd Cell Extract | 1.69 ± .5 | 2.85-3.46 | 18.1 |
| 2nd Cell Extract | 2.03 ± .3 | 3.41-3.78 | 23.2 |
| 1st Cell Extract | 4.47 ± .5 | 4.11-4.50 | 47.1 |

Average cumulative extraction yield = 47.10%.
(Average 3-cell extraction yield = 26-33%.)

EXAMPLE 2

A series of tea extraction pilot plant processes, on the scale of EXAMPLE 1, and following the process outlined in the drawing was conducsted using the following parameters:

For Stage 4:
(a) 3:1 weight ratio of water to wet spent leaf
(b) 1.5% of 50% $H_2SO_4$, basis wet spent leaf, by weight
(c) about 155°-160° C.; 100-120 psig steam
(d) 4-5 min. time at desired temperature.

In Stage 4, the spent leaf was slurried with water, the required acid added, the batch heated to desired temperature, cooled to below the boiling point, vented to release residual pressure and pumped to decanter 16 for separation.

Stages 1-3 conditions included at 10:1 water to fresh leaf ratio, about 98° C. extraction temperature, and about 7.5-8 minute cycle time. In one instance, the ratio of water to fresh leaf was increased to 13⅓:1. Black tea was used.

TABLE II below summarizes the results of the several separate runs:

TABLE II

FOUR-STAGE COUNTERCURRENT EXTRACTION OF BLACK TEA

| High Pressure/ High Temperature | Run No. | | | | | | |
|---|---|---|---|---|---|---|---|
| | 1. | 2. | 3. | 4. | 5.* | 6. | 7. |
| Acid Stage | | | | | | | |
| Extraction Yield | 19.31 | 18.74 | 19.86 | 18.11 | 17.78 | 18.93 | 17.0 |
| pH | 2.5 | 2.49 | 2.44 | 2.4 | 2.60 | 2.18 | 2.49 |
| Stage 3 | | | | | | | |
| Extraction Yield | 21.22 | 20.49 | 21.15 | 20.02 | 20.38 | 22.3 | 19.35 |
| pH | 3.08 | 3.03 | 2.95 | 2.93 | 3.05 | 2.57 | 2.93 |

TABLE II-continued

FOUR-STAGE COUNTERCURRENT EXTRACTION OF BLACK TEA

| High Pressure/ | Run No. | | | | | | |
|---|---|---|---|---|---|---|---|
| High Temperature | 1. | 2. | 3. | 4. | 5.* | 6. | 7. |
| Stage 2 | | | | | | | |
| Extraction Yield | 27.39 | 26.32 | 26.53 | 26.59 | 26.09 | 27.23 | 24.24 |
| pH | 3.72 | 3.72 | 3.61 | 3.56 | 3.61 | 3.13 | 3.46 |
| Stage 1 | | | | | | | |
| Extraction Yield | 44.85 | 43.47 | 43.55 | 44.24 | 47.79 | 47.78 | 46.16 |
| pH | 4.43 | 4.4 | 4.38 | 4.37 | 4.4 | 4.04 | 4.30 |

*Average of these runs with water to leaf ratio of 13½:1

EXAMPLE 3

A series of pilot plant tea extraction processes, on the scale of EXAMPLE 1, but using only two stages, was conducted. The second stage was the high temperature/high pressure acid extraction stage, while Stage 1 was conducted at atmospheric pressure. The conditions of each stage were as follows:

Stage 2:
(a) 3:1 water to wet spent leaf ratio by weight
(b) 1.5% of 37% HCl or 1.5% of 50% $H_2SO_4$, basis wet spent leaf, by weight
(c) 155°–160° C. extraction temperature, with 100–120 psig steam
(d) 4–5 minutes time at desired temperature
(e) the spent leaf was slurried with water, the required acid was added, and the slurry was heated to temperature with steam injection. The slurry was then cooled to below its boiling point, any residual pressure was vented and the slurry then pumped to decanter 16 for evaporation. The leaf was discarded while the extract was used as solvent for Stage 1.

Stage 1 was a conventional atmospheric pressure extraction, using a 10:1 water to fresh dry leaf ratio, an extraction temperature of 98° C. and a cycle time of about 7.5–8 minutes. TABLE III below summarizes the results of these runs.

TABLE III

TWO-STAGE COUNTERCURRENT EXTRACTION OF BLACK TEA

| | STAGE 2 High Pressure/High Temperature Acid Stage | | | STAGE 1 Atmospheric Pressure Stage | | |
|---|---|---|---|---|---|---|
| Run No. | Extraction Yield | pH | Acid | Extraction Yield | pH | Combined Extraction Yield |
| 1. | 19.62 | 2.92 | HCl | 28.32 | 4.91 | 47.94 |
| 2. | 19.18 | 3.2 | $H_2SO_4$ | 26.54 | 4.87 | 45.72 |
| 3. | 17.8 | 2.99 | $H_2SO_4$ | 26.28 | 4.91 | 44.08 |

EXAMPLE 4

A series of pilot plant tea extraction processes, on the scale of Example 1, but using three stages, was conducted. The third stage was the high temperature/high pressure/acid extraction stage, while Stages 1 and 2 were carried out at atmospheric pressure. Conditions used in each of the three stages were as follows:

Stage 3—Same as described in Stage 2 of EXAMPLE 3 above; both HCl and $H_2SO_4$ were tested.

Stage 1—Same as described in Stage 1 of EXAMPLE 3 above.

Stage 2—Same as described for Stage 1, using the acid extract from Stage 3 as solvent. Additional water was added, as needed, to bring fresh leaf ratio to 10:1 by weight.

Data obtained from this series of runs is given in TABLE IV below. Note that the natural buffering capacity of the additional stage accounted for an average gain of 0.9 pH units.

TABLE IV

THREE-STAGE EXTRACTION OF BLACK TEA

| | STAGE 3 High Temperature/ High Pressure/ Acid Extraction | | | Atmospheric Pressure Extraction STAGES 2 and 3 | | | | |
|---|---|---|---|---|---|---|---|---|
| | | | | Extraction Yields | | pH | | Combined |
| Run No. | Extraction Yield | pH | Acid | Stage 1 | Stage 2 | Stage 1 | Stage 2 | Extraction Yields |
| 1. | 21.6 | 2.47 | HCl | 27.45 | 21.6 | 5.02 | 3.42 | 49.05 |
| 2. | 17.66 | 2.66 | $H_2SO_4$ | 26.44 | 18.73 | 5.03 | — | 45.17 |
| 3. | 19.31 | 2.59 | $H_2SO_4$ | 26.48 | 19.9 | 4.97 | 3.52 | 46.38 |
| 4. | 20.29 | 2.51 | HCl | 27.05 | 20.14 | 4.77 | 3.31 | 47.19 |

I claim:

1. The process for extracting tea from dry tea leaf comprising the steps of:
   (a) contacting the tea leaf with aqueous solvent to extract tea leaf solids;
   (b) separating the aqueous extract from the spent tea leaf;
   (c) adding an acid to the spent tea leaf to reduce the pH thereof to within the range of about 2.0–3.0;
   (d) subjecting the acidified spent tea leaf to further extraction with aqueous solvent at pressures of about 80–100 psig and temperatures of about 140°–170° C. for at least 4 minutes; and
   (e) separating the remaining tea leaf solids from the aqueous solvent to leave a high temperature/high pressure aqueous extract.

2. The process of claim 1 wherein the high temperature/high pressure aqueous extract obtained from step (d) is used as an aqueous solvent in step (a) of the process.

3. The process of claim 1, wherein step (a) is a countercurrent extraction procedure using at least two stages and wherein the high temperature/high pressure aqueous extract obtained from step (d) is used as the aqueous solvent in at least one stage.

4. The process of claim 1, wherein step (a) is carried out at atmospheric pressure and at temperatures up to 100° C. in a time sufficient to extract essentially all of the tea solids soluble under said extraction conditions.

5. The process of claim 4, wherein step (a) is a countercurrent extraction procedure having at least two stages and wherein the high temperature/high pressure aqueous extract from step (d) is used as the aqueous solvent in the last of said stages.

6. The process of claim 5, wherein the acid used in step (c) is H₂SO₄.

7. The process of claim 1, wherein step (a) is a countercurrent extraction procedure using at least two stages, the first stage of which provides for contacting raw tea leaf to an aqueous tea extract from a later stage in the procedure and a second stage of which provides for contact of partially extracted tea leaf with fresh aqueous solvent and wherein the fresh aqueous solvent used in the second stage is the high temperature/high pressure aqueous extract obtained from step (d).

8. The process of claim 1, wherein the acid used is a food grade acid selected from the group consisting of HCl, H₃PO₄, H₂SO₃, HNO₃, CH₃COOH and H₂SO₄.

9. The process of claim 1, wherein step (a) is a countercurrent extraction procedure using three stages, the first stage of which provides for contacting raw tea leaf with an aqueous tea extract from a later stage in the procedure and the third stage of which provides for contacting partially extracted tea leaf with fresh aqueous solvent and wherein the fresh aqueous solvent used in the third stage is the high pressure/high temperature aqueous extract obtained from step (d).

* * * * *